Patented Feb. 1, 1944

2,340,580

UNITED STATES PATENT OFFICE 2,340,580

PROCESS OF PURIFYING INDUSTRIAL SANDS

Allen T. Cole, Mulberry, Fla., assignor, by mesne assignments, to Minerals Separation North American Corporation, New York, N. Y., a corporation of Maryland No Drawing. Application July 17, 1942, Serial No. 451,313

3 Claims. (Cl. 209—166)

The present invention relates to an improved process of purifying industrial sands, and particularly glass sands, by froth-flotation.

Such silica sands generally contain ferruginous impurities in the form of iron-bearing and iron-stained minerals which are detrimental in glass making. Although such ferruginous impurities exist in the sands in a very small quantity, it is essential that they be reduced to very low limits. In producing glass sands of the highest quality, it is customary first to remove from them to as great an extent as possible the ferruginous impurities, after which the sands are treated with an acid such as sulfuric acid which dissolves most of the iron impurities, after which the sands are washed to produce the finished product. By removing a large portion of the ferruginous impurities prior to the acid washing, economies can be effected in the amount of acid consumed, time taken to dissolve the ferruginous impurities and the amount of water required for washing.

The present invention is the result of the discovery that industrial sands may be satisfactorily and economically purified by froth-flotation removal therefrom of ferruginous impurities, by the use as cooperating agents of an aliphatic amine, a substantially water insoluble and unsaponifiable oil such as fuel oil, sulfuric acid, and preferably a suitable frothing agent such as pine oil. The advantageous results from the use of such cooperating flotation reagents will be apparent from the examples hereafter given.

The glass sands used in the following examples were obtained from a commercial operation. After being screened to minus 20-mesh, this material was substantially deslimed. The aliphatic amine used in the following examples was a commercial product sold by E. I. du Pont de Nemours & Company, Inc., as "D. P. 243" which is a 50% aqueous paste of technical laurylamine hydrochloride understood to contain approximately 18% octylamine hydrochloride, 10% decylamine hydrochloride, 55% laurylamine hydrochloride, 17% myristyl amine hydrochloride, and traces of secondary and tertiary amines. Aliphatic amines containing from 7 to 19 carbon atoms in the functioning hydrocarbon group also have been found to be effective. These amines may be primary, secondary, tertiary or quaternary.

Example I

A feed of the kind above described was conditioned for about one minute in a thick aqueous pulp containing about 70% solids with cooperating flotation agents consisting of 3.7 lbs. sulfuric acid, 2.6 lbs. fuel oil, 0.25 lb. aliphatic amine and 0.3 lb. pine oil, all per ton of solids in the feed. The thus conditioned feed was subjected to froth-flotation treatment for about three minutes, with the following results:

| Product | Percent weight | Percent Fe |
|---|---|---|
| Feed | 100.0 | .046 |
| Froth product | 2.2 | .680 |
| Machine discharge | 86.4 | .015 |
| Slime | 11.4 | .156 |

Thus, it will be apparent that the treatment resulted in reducing the ferruginous impurities in the sands treated, from .046% to .015%, and that the purified sands amounted to 86.4% of the feed.

Example II

In this treatment, the feed was conditioned in the same way as in Example I, but the amount of aliphatic amine was reduced to 0.2 lb. per ton of solids in the feed. The thus conditioned feed was subjected to froth flotation treatment as in Example I, with the following results:

| Product | Percent weight | Percent Fe |
|---|---|---|
| Feed | 100.0 | .048 |
| Froth product | 1.8 | .780 |
| Machine discharge | 86.7 | .018 |
| Slime | 11.5 | .156 |

It will be noted that this treatment gave almost as good results as Example I, since the ferruginous impurities in the sands were reduced from 0.48% to 0.18%, and the purified sands amounted to 86.7% of the feed.

Example III

In this treatment, all of the factors were the same as in Example II, except that the amount of aliphatic amine was still further reduced to 0.15 lb. while the sulfuric acid was increased to 7.4 lbs., both per ton of solids in the feed, and the conditioning was done in a thin pulp containing about 10% solids. The results were as follows:

| Product | Percent weight | Percent Fe |
|---|---|---|
| Feed | 100.0 | .048 |
| Froth product | 2.5 | .580 |
| Machine discharge | 86.1 | .018 |
| Slime | 11.4 | .156 |

It will be noted that in all of the examples the quantity of sulfuric acid used was far too small to exert any dissolving effect on the iron in the ore. Also, it is apparent that the total quantity of the cooperating flotation agents used in the process is exceedingly small, being in Example I only 6.85 lbs., in Example II only 6.8 lbs. and in Example III only 10.45 lbs. per ton of solids in the feed. Such economy in the use of the agents employed is an important advantage of the invention.

What is claimed is:

1. The process of reducing the amount of ferruginous impurities in industrial sands which consists in conditioning an aqueous pulp of such sands with cooperating flotation agents consisting of sulfuric acid, a water insoluble and unsaponifiable oil, and an aliphatic amine whose functioning hydrocarbon group contains from 7 to 19 carbon atoms, and subjecting the thus conditioned pulp to a flotation operation in which a substantial portion of the ferruginous impurities is removed as a froth product and purified industrial sands are thereby obtained as the machine discharge.

2. A process as in claim 1 in which a frother is used in addition to the other reagents.

3. A process as in claim 1 in which the pulp is substantially deslimed prior to treatment with reagents.

ALLEN T. COLE.